Patented Feb. 19, 1929.

1,702,678

UNITED STATES PATENT OFFICE.

CYRUS FIELD WILLARD, OF SAN DIEGO, CALIFORNIA.

VULCANIZED FIBROUS RUBBER COMPOSITION.

No Drawing. Application filed December 26, 1925. Serial No. 77,872.

My composition consists of devulcanized rubber, which has been devulcanized, in the presence of the fiber without destroying the fiber, by the processes for devulcanizing rubber covered by Patents Nos. 1,322,077; 1,322,151 and 1,322,152, issued to me, Nov. 18, 1919, a vulcanizing agent, an accelerator, pigments, compounds and fillers mixed in such proportions as to make the product thus obtained best adapted to the purpose for which it is designed. The basic mixture of rubber and fiber when dried is in a flocculent mass and it is considered good factory practice to first form such mass into a sheet, by the action of a sheeting-out mill and then by means of a suitable mixing mill reform such sheet and mix the particles thereof with a vulcanizing agent, an accelerator or accelerators, pigments, compounds and fillers. The resultant final mixture is then formed into sheet-shape and vulcanized to make a floor covering superior to linoleum. When this composition of matter is to be used for floor covering, I have found that the best results are obtained when combined in about the following proportions.

| | Parts |
|---|---|
| Devulcanized rubber and fiber | 65 |
| Ferric oxide | 6 |
| Sulfur | 3 |
| Paraffine wax | 2 |
| Thiocarbanalide | .5 |
| Calcium hydrate | 2.5 |
| Petrolatum | 4 |
| Wood flour | 17 |
| | 100 |

It is evident that these proportions may be varied within certain limits depending on the purpose for which the mixture when re-vulcanized is to be used.

These ingredients are mingled and mixed in the following manner:—The mixed devulcanized rubber and fiber as it comes from the devulcanizing kettles is dried to the necessary degree of absence of moisture and when dried it is sheeted and the necessary vulcanizing agent or agents, accelerators, pigments, compounds and fillers are mixed with it when on the usual mixing mill used in rubber factories, or the dried rubber and fiber may be mixed in any other suitable manner in a mixing machine of which the Banbury mixer is an example. It may then run over a "warming-up" mill and then to a calender, such as might be done if any new crude rubber were used. It is then vulcanized in any desired manner.

This sheeted-out material may be vulcanized in a sheet of any desired thickness and length in a belt press or by any other method of vulcanization. When used for floor covering, it may range in thickness from $\frac{1}{16}$ inch to $\frac{1}{4}$ inch and may be 72 inches wide and 30 yards long.

Having described my invention, what I claim is:

The herein described composition of matter for floor covering and other purposes, consisting of substantially sixty-five parts of mixed rubber, and fiber, three parts of sulfur, one-half part of thiocarbanalide, two and one-half parts of calcium hydrate, four parts of petrolatum, six parts of ferric oxide, two parts of paraffine wax and seventeen parts of wood floor, mixed and sheeted out together in a sheet of any desired thickness, width and length and vulcanized in any desired manner, substantially as described and for the purpose specified.

In witness whereof I have affixed my signature hereunto.

CYRUS FIELD WILLARD.